R. H. Hopkins,
Auger.
No. 104,457. Patented June 21, 1870.
Fig. 1
Fig. 3
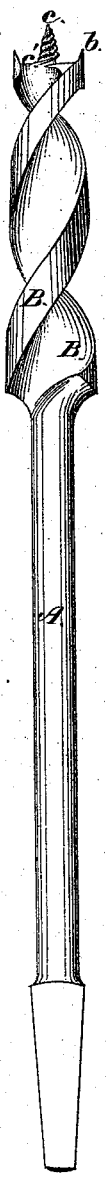
Fig. 2
Witnesses:-
Jos. H. Peyton,
Baltis De Long.
Inventor.
R. H. Hopkins,
by his atty
Wm. D. Baldwin.

United States Patent Office.

RICHARD H. HOPKINS, OF HINSDALE, NEW HAMPSHIRE.

Letters Patent No. 104,457, dated June 21, 1870.

IMPROVEMENT IN AUGER.

The Schedule referred to in these Letters Patent and making part of the same.

*To all whom it may concern:*

Be it known that I, RICHARD HENRY HOPKINS, of Hinsdale, in the county of Cheshire and State of New Hampshire, have invented an Improved Auger or Bit, of which the following is a specification, reference being had to the accompanying drawing, in which—

Figure 1 represents a side elevation of my improved auger;

Figure 2, an end view; and

Figure 3, a transverse section through the same.

My invention is designed more especially for boring and reaming holes in maple-trees to secure the sap for sugar; and The improvement consists in combining in a bit, a central point or gimlet, cutting-lips projecting longitudinally beyond the front cutting-edge of the bit, and spiral double concave cutting-edges, gradually enlarging from the point to the heel of the auger, so that, when boring a hole to different depths on successive days, the last boring shall ream out the dried surface of the hole, and thus produce a new flow of sap.

In the drawing—

A represents a shank or stock, which may be inserted in a suitable handle or brace; from this shank proceed two spiral concave tapering blades or cutters B, which make a bit, of gradually diminishing diameter, terminating in cutting-lips $b$, and having the usual boring-point $c$, and cutting-edges $c'$.

The bit, it will be seen, acts both as a borer and as a reamer.

I do not broadly claim a bit or auger having double concave cutting edges.

I claim the auger, constructed as described, with double concave tapering and spiral cutting-blades, the boring-point $c$, and the cutting-edges $b$ $c'$.

In testimony whereof I have hereunto subscribed my name.

RICHARD H. HOPKINS.

Witnesses:
  HENRY O. COOLIDGE,
  GEO. S. WILDER.